(12) United States Patent
Sobolewski et al.

(10) Patent No.: US 12,498,414 B2
(45) Date of Patent: Dec. 16, 2025

(54) UNIFIED MEASUREMENT SYSTEM FOR STATIC AND DYNAMIC CHARACTERIZATION OF A DEVICE UNDER TEST

(71) Applicant: Keithley Instruments, LLC, Solon, OH (US)

(72) Inventors: Gregory Sobolewski, Brecksville, OR (US); Jeffrey J. Trgovich, Macedonia, OH (US); Brian D. Smith, Whitsett, NC (US); James D. Bucci, Cleveland Heights, OH (US)

(73) Assignee: Keithley Instruments, LLC, Solon, OH (US)

( * ) Notice: Subject to any disclaimer, the term of this patent is extended or adjusted under 35 U.S.C. 154(b) by 247 days.

(21) Appl. No.: 17/688,733

(22) Filed: Mar. 7, 2022

(65) Prior Publication Data

US 2022/0291278 A1    Sep. 15, 2022

Related U.S. Application Data

(60) Provisional application No. 63/260,513, filed on Aug. 23, 2021, provisional application No. 63/161,382, filed on Mar. 15, 2021.

(51) Int. Cl.
*G01R 31/28* (2006.01)
*G01R 31/26* (2020.01)

(52) U.S. Cl.
CPC ..... *G01R 31/2844* (2013.01); *G01R 31/2621* (2013.01); *G01R 31/2839* (2013.01)

(58) Field of Classification Search
CPC ............ G01R 31/2844; G01R 31/2621; G01R 31/2839
See application file for complete search history.

(56) References Cited

U.S. PATENT DOCUMENTS

2019/0369167 A1\* 12/2019 Bhat ................ G01R 31/40

FOREIGN PATENT DOCUMENTS

| CN | 108051719 A | \* | 5/2018 | ......... G01R 31/2608 |
| CN | 212410779 U | \* | 1/2021 | |

OTHER PUBLICATIONS

Machine Translation of CN-108051719-A, downloaded Mar. 2024 (Year: 2024).\*

(Continued)

*Primary Examiner* — John C Kuan
(74) *Attorney, Agent, or Firm* — Miller Nash LLP; Krista Y. Chan

(57) ABSTRACT

A test and measurement system includes a power device having an interface to allow connection to one or more devices under test (DUTs), and one or more processors configured to execute code that, when executed, causes the one or more processors to receive a selection between static and dynamic characterization, and to configure the power device to perform the selected one of static or dynamic characterization of the one or more DUTs, a measurement device, having a user interface, one or more processors configured to execute code that, when executed, causes the one or more processors to: receive user inputs through the user interface, the user inputs including at least the selection between static and dynamic characterization, and send the selected one of static or dynamic characterization to the power device, and a connector to connect the power device to the measurement device.

18 Claims, 4 Drawing Sheets

(56) References Cited

OTHER PUBLICATIONS

Machine translation of CN-212410779-U, downloaded Mar. 2024 (Year: 2024).*

Ghosh et al., "Conceptual Design and Demonstration of an Automatic System for Extracting Switching Loss and Creating Data Library of Power Semiconductors" IEEE Open Journal of Power Electronics (vol. 1) 2020 (Year: 2020).*

Berning et al., "Generalized Test Bed for High-Voltage, High-Power SiC Device Characterization" Conference Record of the 2006 IEEE Industry Applications Conference Forty-First IAS Annual Meeting (Year: 2006).*

* cited by examiner

UNIFIED MEASUREMENT SYSTEM FOR STATIC AND DYNAMIC CHARACTERIZATION OF A DEVICE UNDER TEST

RELATED APPLICATIONS

This disclosure claims benefit of U.S. Provisional Patent Application No. 63/161,382, titled "UNIFIED MEASUREMENT SYSTEM FOR STATIC AND DYNAMIC CHARACTERIZATION OF A DEVICE UNDER TEST," filed Mar. 15, 2021, and the benefit of U.S. Provisional Patent Application No. 63/260,513, titled "HIGH POWER STATIC AND DYNAMIC DUT CHARACTERIZATION," filed Aug. 23, 2021, each of which are incorporated herein in their entirety.

TECHNICAL FIELD

This disclosure relates to test and measurement systems, more particularly to systems and methods for performing static and dynamic characterization of devices.

BACKGROUND

Characterization of a device under test (DUT), for example semiconductor devices such as a silicon-carbide (SiC) metal-oxide-semiconductor field-effect transistor (MOSFET), may generally include both static characterization, such as current/voltage (I/V) curves, and dynamic characterization, such as switching parameters. Conventional static characterization involves use of a dedicated static measurement platform. Additionally, conventional dynamic characterization of DUT involves a different measurement platform, in some cases a dedicated custom dynamic platform.

A further complication may arise regarding high power devices, such as FETs, because they undergo characterization with pulse signals due to the safe operating area (SOA) limitations. This may involve the use of specialized circuits for dynamic characterization.

Embodiments of the disclosed apparatus and methods address shortcomings in the prior art.

DETAILED DESCRIPTION

Figure 1:
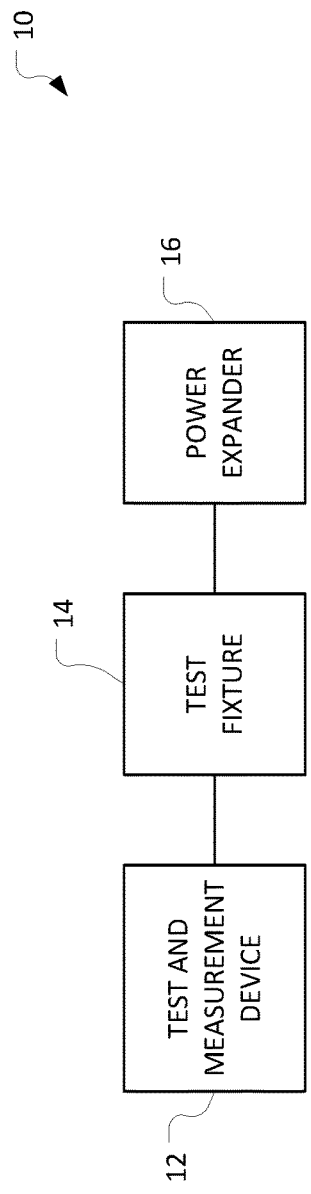
FIG. 1 shows an example of a dedicated static characterization measurement platform.

Conventionally, high power characterization of devices under test (DUT) typically involves a static measurement platform. FIG. 1 shows an example of such a platform 10. In this example, the platform includes a test and measurement device 12, a test fixture 14 to which the DUT is connected, and power expander 16. Examples of these types of platforms include Keysight B1505A, B1505B, and B1506B.

Figure 2:
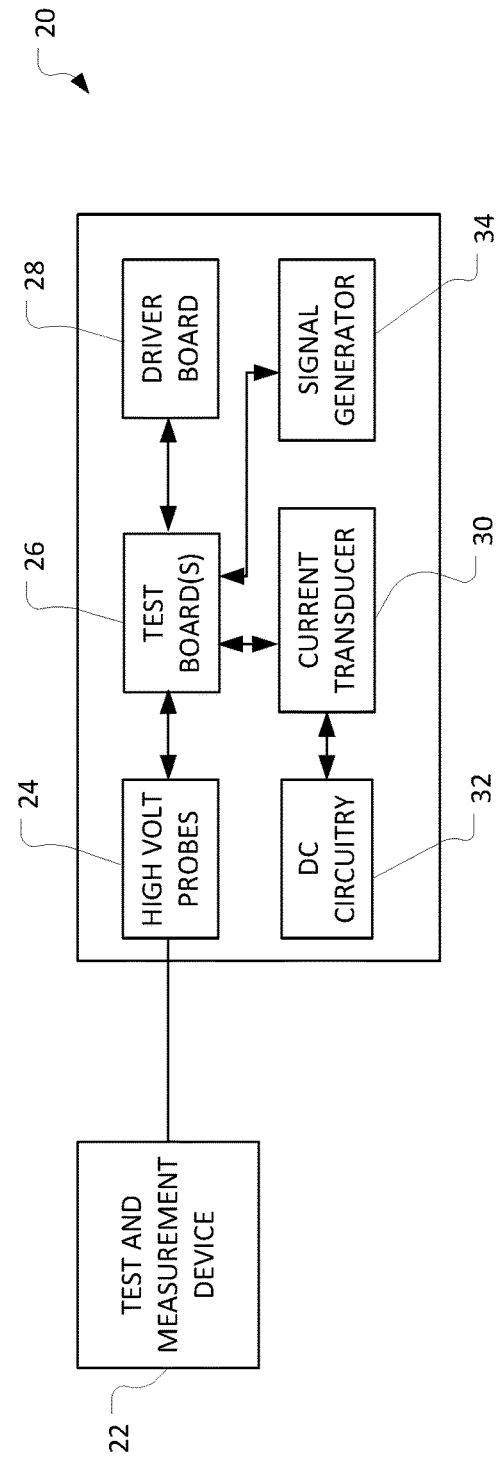
FIG. 2 shows an example of a dedicated dynamic characterization measurement platform.

In order to perform dynamic power characterization, users would require a separate platform, such as a Keysight PD1500, which is a large floor model platform, or a custom platform. FIG. 2 shows an example of such a platform 20 that may include some or all of the components shown. A test and measurement device 22 may actually comprise one or more test and measurement devices, such as an oscilloscope and an impedance analyzer. The test and measurement device connects to the test boards, the DUT, 26, by high voltage probes 24. The test boards may have a driver board 28, typically used to turn power switches on and off with stability and possibly provide power protection. The DC circuitry 32 may include DC-link capacitances, a DC voltage supply, and load inductors. A current transducer 30 and a signal generator 34 connect to the test boards to allow the boards to be tested.

Generally, characterizing the devices either statically or dynamically takes separate, large instrument and fixture platforms. The embodiments here provide a combined characterization system that has two components, an interactive test and measurement device such as an oscilloscope, impedance analyzer, combination of both, or one or more of many other test and measurement devices. For simplicity, this discussion will refer to this component as a test and measurement device. The other component is a power delivery and measurement front end with a DUT interface for mounting the test boards, which this discussion may also refer to as the fixture. The embodiments here generally involve two separate components, but they could also be mounted into one housing.

As used here, the term "high voltage" refers to any voltage including and above 42 volts.

The embodiments here provide a dual-purpose characterization platform with several advantages. The system, meaning both components, allows transportation by one individual. The fixture encloses all the high voltage circuitry for safety and may have an interlock that prevents improper operation of high voltage systems that may result from faults in the system. The system simplifies setup in that the user only needs to put the DUT into the fixture. The two components connect by a simple cable, so the system does not require re-cabling. Automated switching of the measurement configuration allows the user to obtain all the desired parameters for the tests. The fixture may also include heating and/or cooling equipment, and a protective barrier around the device in case of device damage.

Figure 3:
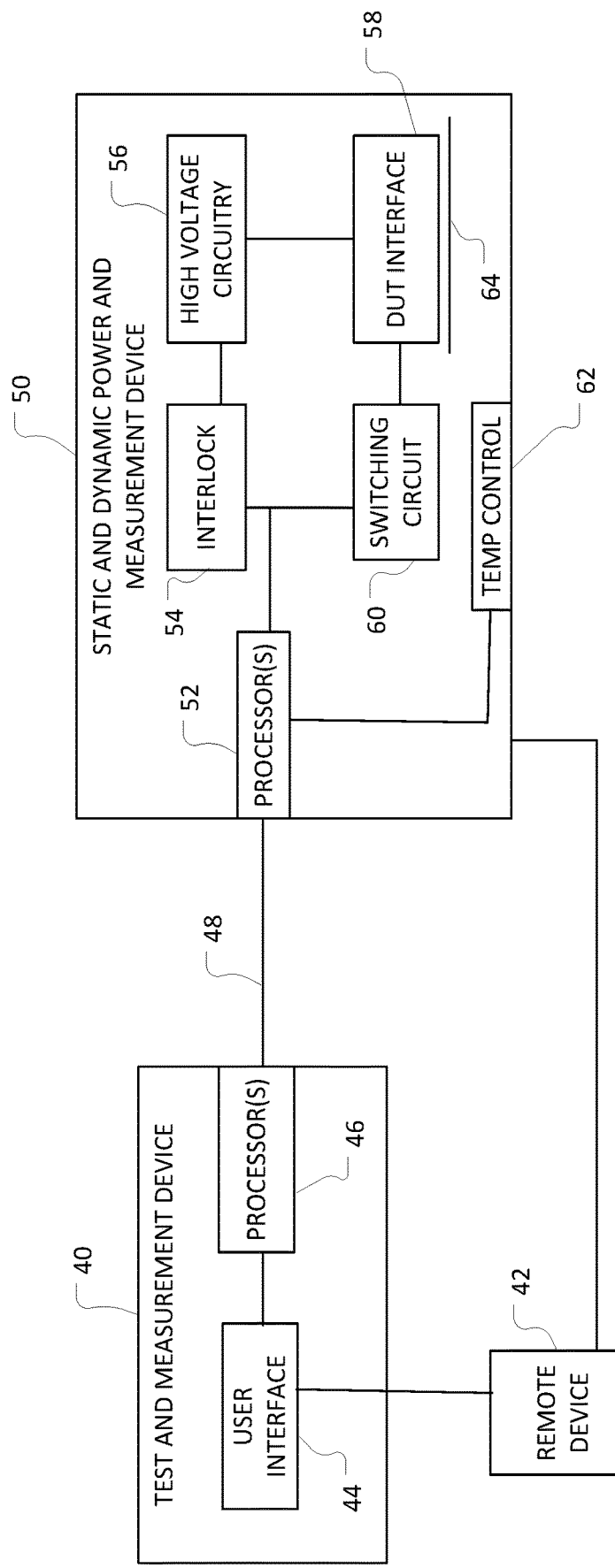
FIG. 3 shows an embodiment of a unified measurement system.

FIG. 3 shows an embodiment of a test and measurement system, which may also be referred to as a platform, having a test and measurement device 40 such as an oscilloscope or other test and measurement device. For ease of discussion, the device 40 may be referred to as a measurement device. The other part of the system is a static and dynamic power and measurement device 50, which will be referred to as a power device for ease of discussion. These terms are not intended to limit the capabilities of either device, so no such limitation should be implied.

The measurement device 40 may have many different components, including a user interface 44 that allows a user to interact with various menus. The user interface allows the user to make selections as to the tests to be run, set parameters, etc., such as through a display having a touch screen or various buttons and knobs. The measurement device 40 has one or more processors 46 that receive the user inputs and send the parameters and other selections to the measurement device, and may receive output from the power device and generate outputs for the user from the data. A remote device 42, such as a computing device such as a personal computing device or smart phone, may also access the test and measurement platform to be operated remotely, either through the measurement device 40 or the power device 50. The term "processor" as used here means any electronic component that can receive an instruction and perform an action, such as a microcontroller field programmable gate array (FPGA), application-specific integrated circuit (ASIC), as will be discussed in more detail further.

The measurement device 40 communicates with the power device 50 through a cable or other direct connection 48. The two devices and their cable are configured to be portable, transportable by one individual. The cable connects to each device through connection circuitry that allows the devices to switch configurations without having to re-cable.

The power device 50 may also have several different elements. These may include one or more processors such as 52, high voltage circuitry 56 that provides high voltage to the device under test (DUT), and an interlock 54 that acts as a protection for the high voltage circuitry. The interlock is designed to prevent device damage or any dangerous conditions resulting from the high voltage produced by the high voltage circuitry. The DUT mounts to the DUT interface 58, which may comprise a universal DUT interface to which the DUTs are mounted that allows the DUT to connect to the various components in the power device.

High voltage circuitry and the operation of the DUTs may generate heat, and/or the DUTs may need a particular temperature range to operate. The power device may include temperature control circuitry 62 to control the temperature of the DUT. The one or more processors 52 monitor the temperature and operate the temperature control 62 which may comprise items such as fans, switchable heat sinks, cooling systems, heaters, etc. The power device may also include a barrier 64 to protect the one or more DUTs in case of damage. The power device may also include a switching circuit 60.

Figure 4:
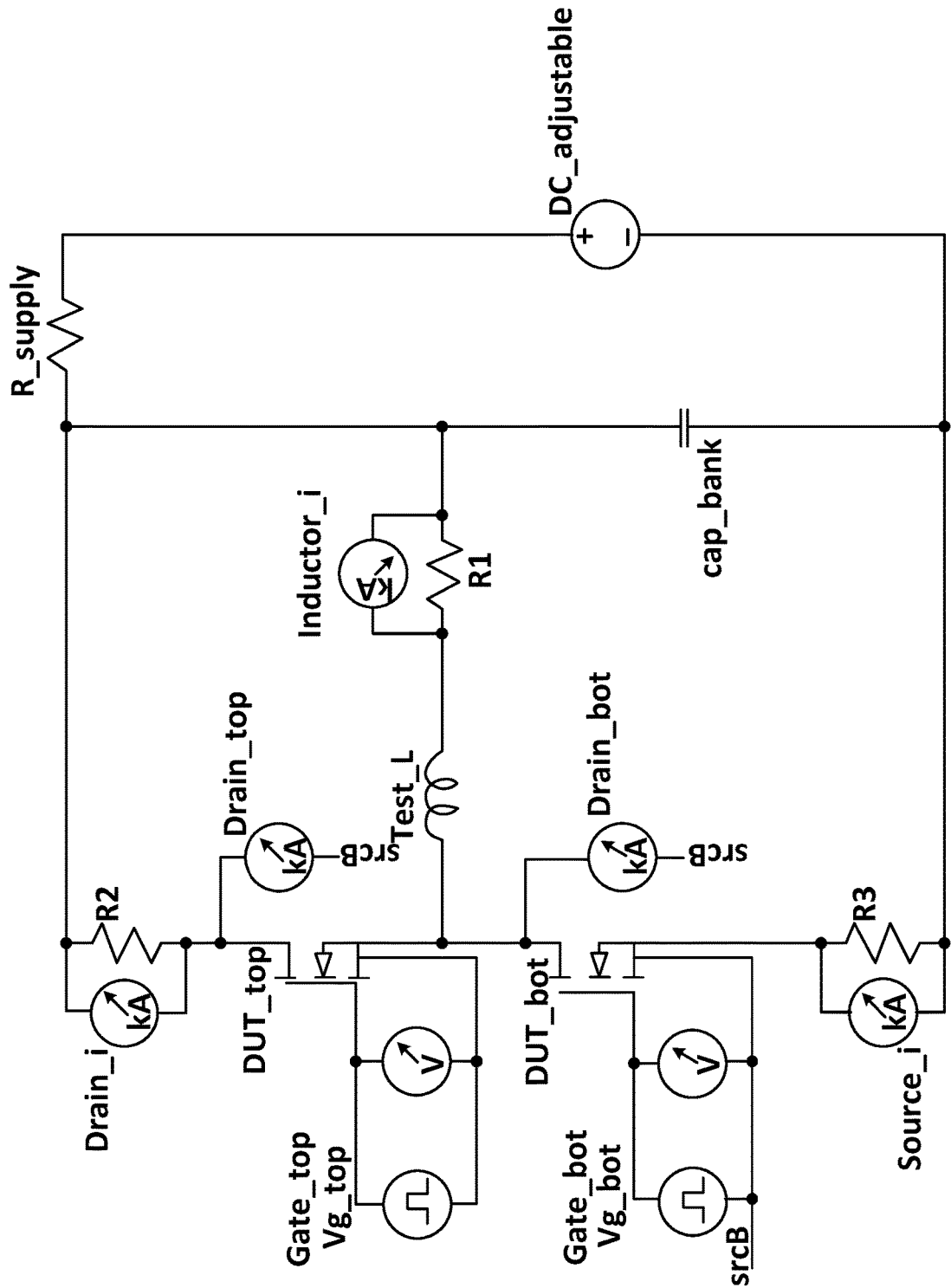
FIG. 4 shows an embodiment of a characterization circuit.

In operation, the user makes an input through the user interface, remotely or directly, to select whether the device (s) are to be characterized statically or dynamically. Dynamic characterization may be accomplished using a half bridge circuit such as the embodiment shown in FIG. 4. One method of performing dynamic characterization, referred to here as the double pulse method, uses this type or circuit. In operation, the bottom device, DUT_bot, is turned on to obtain desired current through the Test_L inductor. Subsequently, the bottom device, DUT_bot, is turned off and the top device, DUT_top, is turned on. This circulates the inductor current from the Test_L inductor. Alternatively, the top device may be replaced by a diode, if only one DUT is being tested. After a specified time that depends upon the circuit characteristics, the top device is turned off, and the bottom device is turned on. The desired data may be collected during both device transitions and energy losses are calculated. This same platform, depending upon the control of voltages and currents through the devices, can be used to extract static parameters.

Replacing the top DUT with a diode or a short allows gate control of the bottom device that in turn allows extraction of static current-voltage (I/V) curves. With the top DUT available, additional methods of extracting static data can be used. These may include independent gate/drain pulsing of potentials at the bottom DUT. To do so, the system would control the voltage at the gate of the bottom DUT to allow proper transfer characteristics measurements of the device. Static I/V device characterizations do not need the inductor Test_L, but its presence allows the same circuit to perform both static and dynamic characterizations. If both top and bottom DUTs exist in the circuit and are the same types of devices, the maximum power configuration would be split between the two devices. If a full power test of one of the devices is desired, the other device would be replaced with a short.

Figure 5:
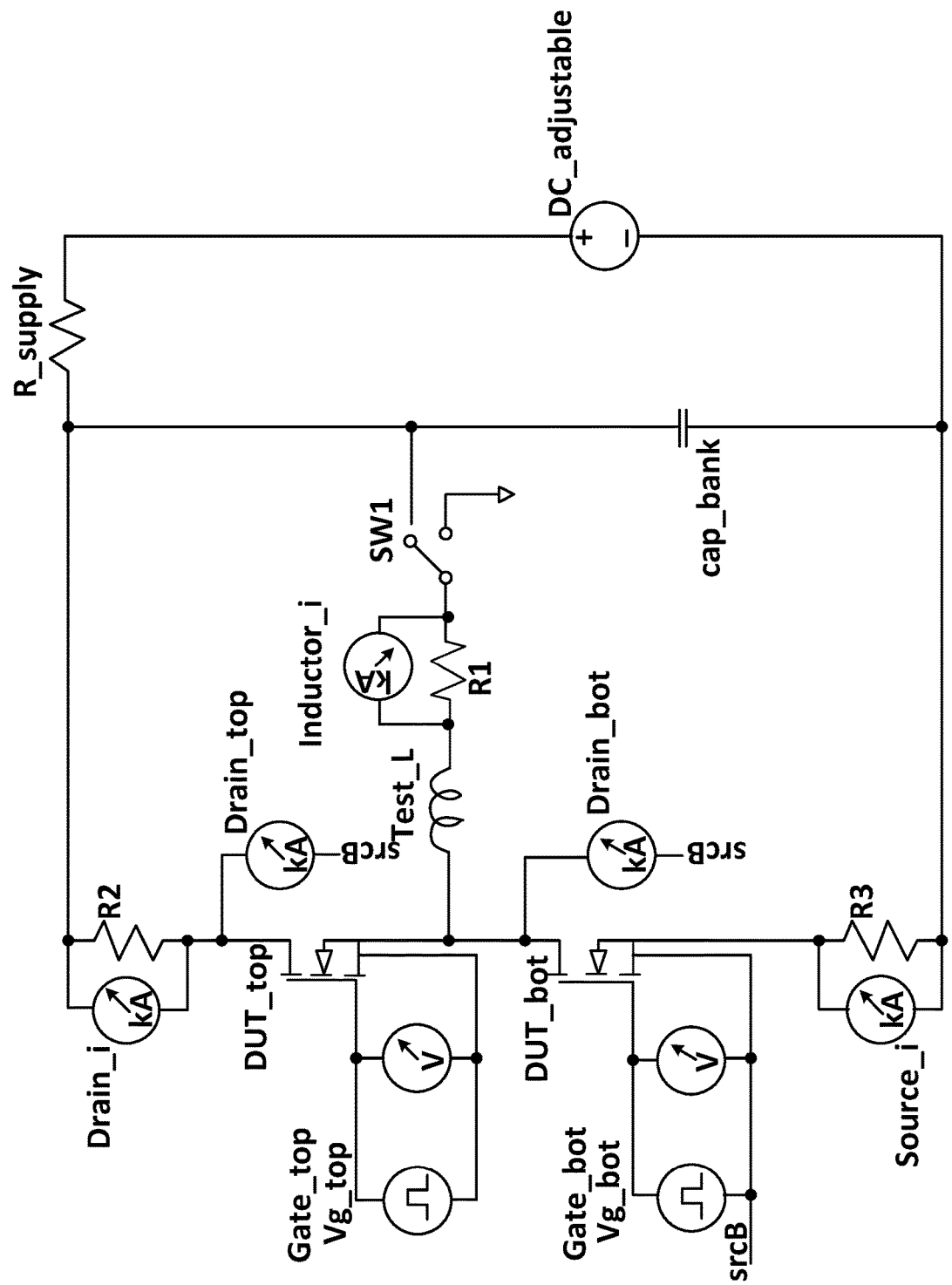
FIG. 5 shows an embodiment of a circuit adaptable for both static and dynamic characterization.

FIG. 5 shows an embodiment of a half-bridge switching circuit that includes a switch used to allow selection between the top and bottom devices. The selection may come into the power device through a user interface on the measurement device and passed to it through a cable. With the addition of switch, SW1, if both DUTs are installed, both can be characterized in static and dynamic configurations. The configuration shown in FIG. 5 selects DUT_bot. In operation, the user selects static or dynamic characterization, as well as the selection of one of the one or more DUTs through the user interface on the measurement device 40 of FIG. 3. The one or more processors then send the selections and any other parameters to the power device. The one or more processors in the power device will then provide signals to the circuit, if used, to set SW1.

This test and measurement system provides the ability to combine static and dynamic measurements without the need to use multiple setups and instruments, or even the need to re-cable a particular configuration. The system outputs characterization data. This data may be produced on the user interface of the measurement device, and/or may be output to a file for further analysis such as in a file for an analysis software package. This may be accomplished by the one or more processors in either the power device or the measurement device.

Aspects of the disclosure may operate on a particularly created hardware, on firmware, digital signal processors, or on a specially programmed general purpose computer including a processor operating according to programmed instructions. The terms controller or processor as used herein are intended to include microprocessors, microcomputers, Application Specific Integrated Circuits (ASICs), and dedicated hardware controllers. One or more aspects of the disclosure may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a non-transitory computer readable medium such as a hard disk, optical disk, removable storage media, solid state memory, Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGA, and the like. Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or non-transitory computer-readable media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include RAM, ROM, Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

Communication media means any media that can be used for the communication of computer-readable information. By way of example, and not limitation, communication media may include coaxial cables, fiber-optic cables, air, or any other media suitable for the communication of electrical, optical, Radio Frequency (RF), infrared, acoustic or other types of signals.

Additionally, this written description makes reference to particular features. It is to be understood that the disclosure in this specification includes all possible combinations of those particular features. For example, where a particular feature is disclosed in the context of a particular aspect, that feature can also be used, to the extent possible, in the context of other aspects.

Also, when reference is made in this application to a method having two or more defined steps or operations, the defined steps or operations can be carried out in any order or simultaneously, unless the context excludes those possibilities.

Examples

Illustrative examples of the disclosed technologies are provided below. An embodiment of the technologies may include one or more, and any combination of, the examples described below.

Example 1 is a test and measurement device comprising a power device, comprising: an interface to allow connection to one or more devices under test (DUTs); and one or more processors configured to execute code that, when executed, causes the one or more processors to receive a selection between static and dynamic characterization, and to configure the power device to perform the selected one of static or dynamic characterization of the one or more DUTs; a measurement device, comprising: a user interface; and one or more processors configured to execute code that, when executed, causes the one or more processors to: receive user inputs through the user interface, the user inputs including the selection between static and dynamic characterizations; and send the selected one of static and dynamic characterization to the power device; and a connector to connect the power device to the measurement device.

Example 2 is the test and measurement system of Example 1, wherein the power device further comprises high voltage circuitry connected to the DUT interface to provide power to the one or more DUTs.

Example 3 is the test and measurement system of Example 2, wherein the power device further comprises an interlock connected to the high voltage circuitry.

Example 4 is the test and measurement system of any of Examples 1 through 3, wherein the power device includes temperature control equipment.

Example 5 is the test and measurement system of any of Examples 1 through 4 wherein the power device includes a protective barrier around the one or more DUTs.

Example 6 is the test and measurement system of any of Examples 1 through 5 wherein the one or more processors on the measurement device further execute code to interface with a remote computer.

Example 7 is the test and measurement system of any of Examples 1 through 6, wherein the one or more processors on the measurement device further execute code to produce characterization output data.

Example 8 is the test and measurement system of any of Example 7, wherein the one or more processors on the measurement device further execute code to produce the characterization output data in a format configured for an analysis software package.

Example 9 is the test and measurement system of any of Example 7, wherein the characterization output data includes static characterization output data and dynamic characterization output data.

Example 10 is the test and measurement system of any of Examples 1 through 8, wherein the power device further comprises a switching circuit to select one of the one or more DUTs.

Example 11 is the test and measurement system of Example 10, wherein the one or more processors in the measurement device are further configured to execute code to receive a user input designating one of the DUTs for characterization and to pass the user input to the power device.

Example 12 is a method of operating a static and dynamic device characterization platform, comprising: receiving, through a user interface on a measurement device, a user input selecting between static and dynamic characterization of one or more devices under test (DUT); sending the user input through a connection between the measurement device and a power device; receiving the user input at a power device; controlling signals to the one or more DUTs in the power device to perform one of static or dynamic characterization of the one or more DUTs; and sending output data resulting from the characterization to the measurement device.

Example 13 is the method of Example 12, further comprising monitoring the temperature of the one or more DUTs.

Example 14 is the method of Example 12, further comprising operating temperature control equipment to manage the temperature of the one or more DUTs.

Example 15 is the method of any of Examples 12 through 14, further comprising receiving a user input through the user interface, the user input selecting one of the one or more DUTs for characterization and sending the user input through the connection to the power device.

Example 16 is the method of Example 15, further comprising setting a switch in the power device to select the one of the one or more DUTs.

Example 17 is the method of any of Examples 12 through 16, wherein controlling signals to the one or more DUTs to perform one of static or dynamic characterization comprises performing dynamic characterization of the one or more DUTs.

Example 18 is the method of any of Examples 12 through 17, wherein performing dynamic characterization comprises performing a double pulse test sequence on one of the one or more DUTs.

Example 19 is the method of any of Examples 12 through 18, wherein controlling the signals to the one or more DUTs to perform one of static or dynamic characterization comprises performing static characterization of the one or more DUTs.

Example 20 is the method of Example 19, wherein performing static characterization of the one or more DUTs comprises applying signals to one of the one or more DUTs to output one or more current-voltage curves.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Although specific embodiments have been illustrated and described for purposes of illustration, it will be understood that various modifications may be made without departing from the spirit and scope of the disclosure. Accordingly, the invention should not be limited except as by the appended claims.

The invention claimed is:

1. A test and measurement system, comprising:
   a power device, comprising:
      an interface to allow connection to a plurality of devices comprising a first device and a second device, the first device coupled to a first resistor and to the second device in series, the second device coupled to a second resistor and to the first device in series;
      a switching circuit configured to select one of the plurality of devices, wherein the switching circuit is coupled to a node between the first device and the second device and coupled to ground; and
      one or more processors configured to execute code that, when executed, causes the one or more processors to receive a selection between static and dynamic characterization, and to configure the power device to perform the selected one of static or dynamic characterization of the plurality of devices;
   a measurement device, comprising:
      a user interface; and
      one or more processors configured to execute code that, when executed, causes the one or more processors to:
         receive user inputs through the user interface, the user inputs including at least the selection between static and dynamic characterization; and
         send the selected one of static or dynamic characterization to the power device; and
      a connector to connect the power device to the measurement device.

2. The test and measurement system as claimed in claim 1, wherein the power device further comprises high voltage circuitry connected to the interface to provide power to the plurality of devices.

3. The test and measurement system as claimed in claim 2, wherein the power device further comprises an interlock connected to the high voltage circuitry.

4. The test and measurement system as claimed in claim 1, wherein the power device includes temperature control equipment.

5. The test and measurement system as claimed in claim 1, wherein the power device includes a protective barrier around the plurality of devices.

6. The test and measurement system as claimed in claim 1, wherein the one or more processors on the measurement device further execute code to interface with a remote computer.

7. The test and measurement system as claimed in claim 1, wherein the one or more processors on the measurement device further execute code to produce characterization output data.

8. The test and measurement system as claimed in claim 7, wherein the one or more processors on the measurement device further execute code to produce the characterization output data in a format configured for an analysis software package.

9. The test and measurement system as claimed in claim 7, wherein the characterization output data includes static characterization output data and dynamic characterization output data.

10. The test and measurement system as claimed in claim 1, wherein the one or more processors in the measurement device are further configured to execute code to receive a user input designating one of the plurality of devices for characterization and to pass the user input to the power device.

11. A method of operating a combined static and dynamic device characterization platform, comprising:
   receiving, through a user interface on a measurement device, a user input selecting between static and dynamic characterization of a device under test (DUT) of a plurality of devices, wherein the plurality of devices are coupled to the measurement device through a DUT interface, wherein the plurality of device comprises the DUT and a second device, the DUT coupled to a first resistor and to the second device in series, the second device coupled to a second resistor and to the DUT in series;
   sending the user input through a connection between the measurement device and a power device;
   receiving the user input at the power device;
   setting a switch in the power device to select one of the plurality of devices, wherein the switch is coupled to a node between the DUT and the second device and coupled to ground;
   controlling signals to the plurality of devices in the power device to perform one of static or dynamic characterization of the DUT; and
   sending output data resulting from the characterization to the measurement device.

12. The method as claimed in claim 11, further comprising monitoring a temperature of the DUT.

13. The method as claimed in claim 11, further comprising operating temperature control equipment to manage a temperature of the DUT.

14. The method as claimed in claim 11, further comprising receiving a user input through the user interface, the user input selecting one of the plurality of devices for characterization and sending the user input through the connection to the power device.

15. The method as claimed in claim 11, wherein controlling signals to the plurality of devices to perform one of static or dynamic characterization comprises performing dynamic characterization of the DUT.

16. The method as claimed in claim 15, wherein performing dynamic characterization comprises performing a double pulse test sequence on the DUT.

17. The method as claimed in claim 11, wherein controlling the signals to the plurality of devices to perform one of static or dynamic characterization comprises performing static characterization of the plurality of devices.

18. The method as claimed in claim 17, wherein performing static characterization of the plurality of devices comprises applying signals to one of the plurality of devices to output one or more current-voltage curves.

* * * * *